United States Patent [19]

Bart

[11] 4,026,183

[45] May 31, 1977

[54] SEALING WASHER

[75] Inventor: Joseph James Bart, St. Charles, Ill.

[73] Assignee: Illinois Tool Works Inc., Chicago, Ill.

[22] Filed: May 17, 1976

[21] Appl. No.: 686,767

[52] U.S. Cl. .................................. 85/1 JP; 151/38
[51] Int. Cl.² ................... F16B 35/00; F16B 39/24
[58] Field of Search ............ 85/1 JP, 50 R; 151/38; 277/166, 235 R

[56] References Cited

UNITED STATES PATENTS

| | | | |
|---|---|---|---|
| 1,963,535 | 6/1934 | Trotter | 151/38 |
| 3,009,722 | 11/1961 | Augustin | 85/1 JP X |
| 3,160,054 | 12/1964 | Cohen et al. | 85/1 JP |
| 3,286,577 | 11/1966 | Weidner | 85/1 JP |
| 3,588,787 | 6/1971 | Kindell et al. | 151/35 X |
| 3,631,910 | 1/1972 | Crowther | 151/38 |
| 3,670,618 | 6/1972 | Jellison | 85/1 JP |
| 3,856,066 | 12/1974 | Reynolds | 151/38 |
| 3,882,752 | 5/1975 | Gutshall | 85/1 JP |

FOREIGN PATENTS OR APPLICATIONS 779,361  4/1935  France ................... 151/38

Primary Examiner—Ramon S. Britts
Attorney, Agent, or Firm—Thomas W. Buckman; Robert W. Beart

[57] ABSTRACT

A spring washer unit with sealing capabilities with an inner dish-like spring washer section having a lower load bearing surface located radially inwardly of the outer margin of the washer. The region between the outer margin of the washer and the load bearing surface forms a recess within which a sealing ring is positioned so that the load on the washer is carried on a minimum diameter and bolt load is not effected by cold flow of the sealing ring since the sealing ring is not clamped between the load bearing surface and the workpiece.

4 Claims, 5 Drawing Figures

SEALING WASHER

BACKGROUND OF THE INVENTION

This invention relates generally to sealing washers and more particularly to sealing washers of a composite variety which are capable of spring loading a clamped joint.

Rubber-like sealing rings have heretobefore been associated with rigid washer devices in such a manner that the sealing washer is compressed beneath the rigid washer serving to prevent moisture from entering the joint. Such devices do not have the capability of providing a continual spring load to the bolt in the fastened joint. Other prior art devices of a sealing washer variety utilize a spring-type washer with a sealing material positioned beneath the washer and more particularly between the workpiece and the clamping surface of the washer. This type of device produces a bolt load loss due to the cold flow of the sealing material beneath the clamping surface of the washer. The load on the bolt resulting from the spring surface will decrease over a period of time.

Still further prior art sealing washers utilize a sealing ring or sealig material beneath the surface of a spring washer located interiorly of the outer clamping surface. This type of configuration does not permit the minimization of the material thickness of the spring washer for a given load desired since the clamp load diameter of the washer must always be greater than the sealing ring diameter.

SUMMARY OF THE INVENTION

It is a general object of the present invention to provide a washer unit which will both seal a joint and provide continual spring load to the bolt in the joint.

A further object of the invention is to provide a sealing, spring washer which will minimize the material thickness of the washer for a given load to be positioned over an aperture of a given size.

Still a further object of the invention is to provide a sealing, spring washer unit where the spring load on a bolt is not effected by the cold flow of the sealing material in the washer.

These and other objects and advantages of the invention are achieved by a washer unit which includes a metal washer portion including an inner dish-like spring section and an outer marginal section wherein the lower load bearing surface of the spring section is located radially inwardly of the outer perimeter of the washer. A sealing washer ring is positioned in the recess formed beneath the outer marginal section with the depth of the recess being less than the thickness of the washer so that the sealing member can be compressed beneath the recess but located entirely outwardly of the clamping or load bearing surface of the spring washer.

Further features of the invention include a dual action inner spring section which will further contribute to the minimization of the material thickness for a given load and aperture to be spanned.

The radial dimension between the aperture of the washer and the clamping surface can be minimized by the positionment of the sealing ring exteriorly of the clamping surface. This construction will thus permit the washer to be configured of a minimum thickness for a given spring load requirement. Since the sealing ring is compressed in an area outside of the load bearing surface of the spring, there is no load loss in the system resulting from cold flow of the resilient material.

BRIEF DESCRIPTION OF THE PREFERRED EMBODIMENT

Figure 1:
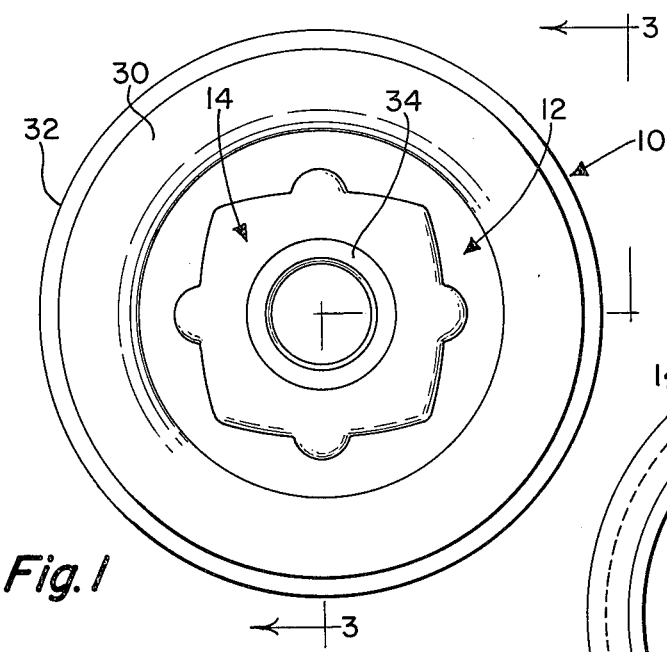
FIG. 1 is a top plan view of the washer unit.

A composite washer unit 10 includes a metal washer member 12 and a resilient sealing ring 34 positioned therebeneath at the outer marginal region thereof. The washer member 12 will generally include an inner, dish-like spring section 14 and an outer marginal surface section 30. The inner spring section of the metal washer 14 will define an annular bearing surface 26 spaced radially outwardly and downwardly from the central aperture 24. This inner section will thus function as a conventional conical spring washer in that as a clamping load is applied to the upper surface of the washer, the washer will be compressed downwardly with the load being transferred to the workpiece at the bearing surface 26. Such devices will thus provide a continual load on the bolt in the joint reducing the effects of vibration or the like from loosening the clamp load in the joint.

Figure 3:
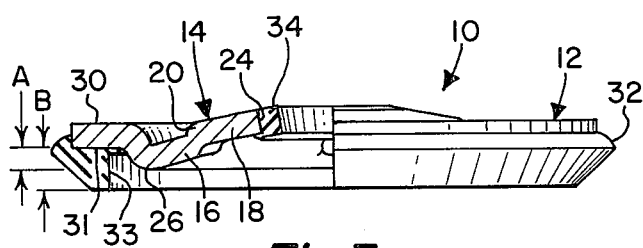
FIG. 3 is a side view in partial section of the washer unit.

The lower surface of the outer marginal section 30 of the washer 12 is basically in the form of a recess 31 which extends upwardly and outwardly from the clamping surface 26 of the spring section. As shown in FIG. 3, the height of the recess is of a predetermined axial dimension A.

A rubber like annular sealing ring 32 is positioned within recess 31 and preferably bonded thereto. The sealing ring 32 will be of a thickness B which is greater than the height of the recess to ensure that the sealing ring will be compressed. It should be noted that the sealing ring is located entirely outside of the diameter defined by the clamping surface 26. In fact, it may be preferable that the innermost wall 33 of the sealing ring be radially spaced from the abutment surface 26 so that as the sealing member is compressed the sealing material will not be forced inwardly to underlie the clamping surface.

Figure 4:
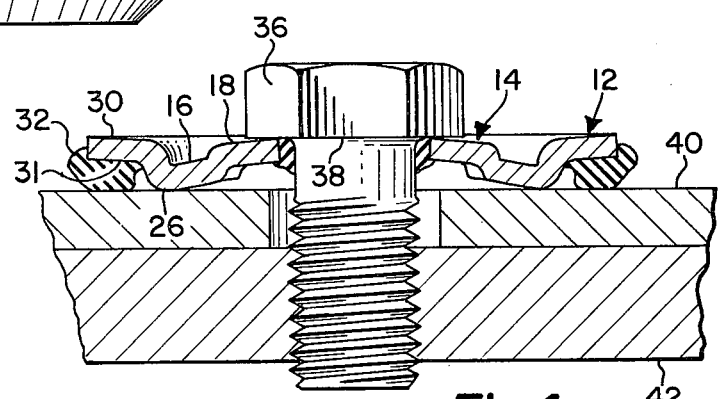
FIG. 4 is a sectional view of the washer unit of the invention combined with a bolt and associated with workpieces when the washer unit is partially compressed.
Figure 5:
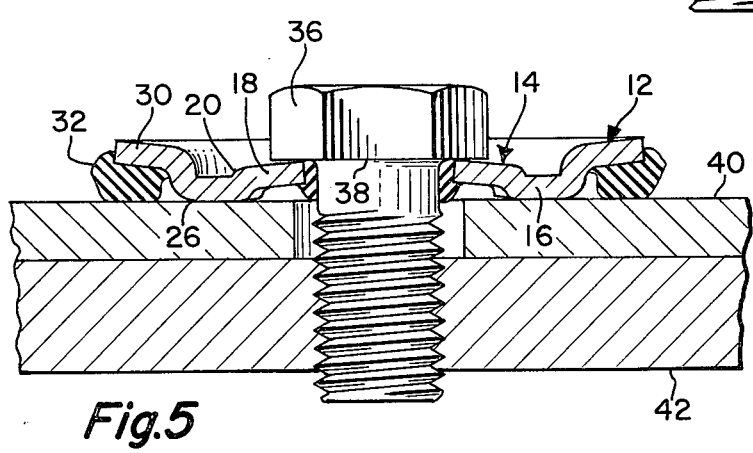
FIG. 5 is a sectional view similar to FIG. 4 but showing the washer unit substantially fully compressed between the bolt head and the workpiece.

Turning to FIGS. 4 and 5, the operation of the unit will be described. As a bolt 36 with a bearing surface 38 beneath its head compresses the innermost margin of the washer against a workpiece, or pair of workpieces such as 40 and 42, the sealing ring 32 will first compress between the workpiece and the recess 31. It is importantto note that the location of the sealing ring 32 is such that there will be no sealing material between the clamping surface 26 of the washer and the workpiece.

The innermost spring section 14 of the washer may be comprised of a pair of generally dish-shaped spring portions 16 and 18 interconnected by a short strut portion 20, which is preferably of an axial dimension not greater than the combined thicknesses of the two spring sections. Such a configuration will provide a dual spring capability to the system wherein the outermost section 16 is first compressed, as shown in FIG. 4, followed by the compression of the innermost section 18 at higher loads. Such a combination of spring sections will serve to maximize the load for a given diameter and thickness of a washer. This dual spring concept, in conjunction with the location of the bearing surface inwardly of the sealing ring, will enable the washer member to be minimized in thickness.

The innermost spring section 18 may preferably be of a polygonal perimetal configuration. This configuration in conjunction with struts 20 will increase the load bearing capabilities of the washer.

A secondary sealing ring 34 may be positioned within and bonded to the aperture ring of the washer. This ring will provide an interference between the shank of the bolt and the washer and seal the joint from moisture in that region.

Figure 2:
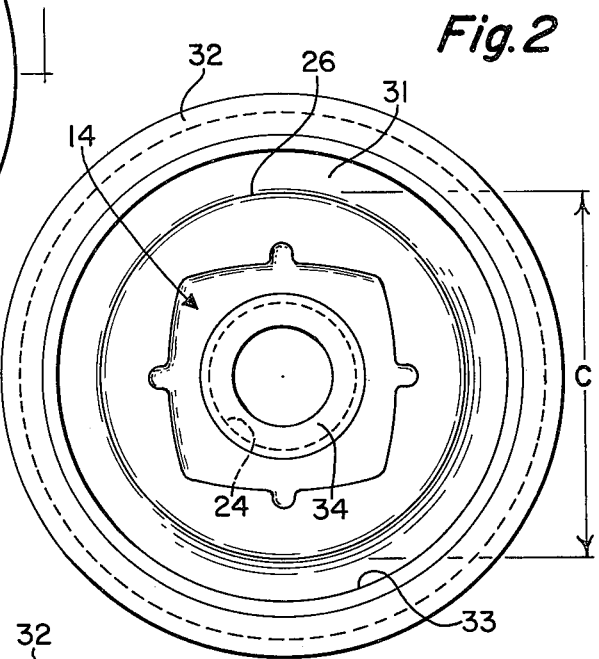
FIG. 2 is a bottom plan view of the washer unit.

While the embodiment shown herein includes a pair of interconnected spring sections 16 and 18, it should be understood that a single dish-shaped spring washer configuration can be utilized and still isolate the spring from results of cold flow of the sealing washer. It should also be apparent that the effective load diameter C, as shown in FIG. 2, defined by the clamping surface 26, is smaller than the diameter of the washer due to the placement of a sealing ring totally outside of the spring region. This configuration permits the load bearing diameter C to be minimized, thus permitting the thickness of the material to be minimized for a given load requirement and for a given clearance hole to be spanned.

This it is apparent that there has been provided in accordance with the invention a sealing and spring washer that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the broad scope of the appended claims.

I claim:

1. A composite sealing spring washer unit including a spring washer having an inner, dish-like spring section with a centrally located aperture spaced axially upwardly from a bearing surface, and axially displaceable downwardly under load, the bearing surface spaced radially inwardly of the outer perimeter of the washer member, the outer marginal surface section of the washer member forming a radially outwardly opening recess therebeneath between the bearing surface of the spring section and the outer perimeter of the washer member, the recess including an inner wall terminating at said bearing surface and extending upwardly therefrom and a generally planar upper wall extending radially outwardly from the inner wall, said inner wall providing a predetermined maximum height from the bearing surface to the upper wall of the recess, a resilient sealing ring positioned within the recess securely bonded thereto with the inner periphery of the sealing ring forming a generally cylindrical wall extending substantially perpendicular to the upper wall of the recess, said cylindrical inner wall periphery being substantially spaced radially outwardly from the inner wall of the recess and the bearing surface to prevent the sealing material from being compressed between the bearing surface and the workpiece, the sealing ring having a thickness which is greater than the predetermined height of the recess to permit a compressed seal to be formed beneath the washer and outwardly off the bearing surface.

2. The composite sealing, spring washer unit in accordance with claim 1, wherein the inner section comprises two dish-like spring sections interconnected by a continuous strut extending parallel to the axis of the washer and of a height substantially equal to twice the thickness of the washer member, the strut adapted to about the workpiece beneath the washer as the outermost of the two spring sections is compressed.

3. The composite sealing, spring washer unit in accordance with claim 1, including a second sealing ring bonded to and within the aperture of the washer member.

4. The composite sealing, spring washer unit in accordance with claim 2, wherein the innermost of the two spring sections is generally polygonal in outer perimetric configuration and the outermost of the two spring sections is generally circular in outer perimetric configuration.

* * * * *